A. V. H. WEBB.
Apparatus for Producing Camphene.
No. 1,082. Patented Feb. 19, 1839.
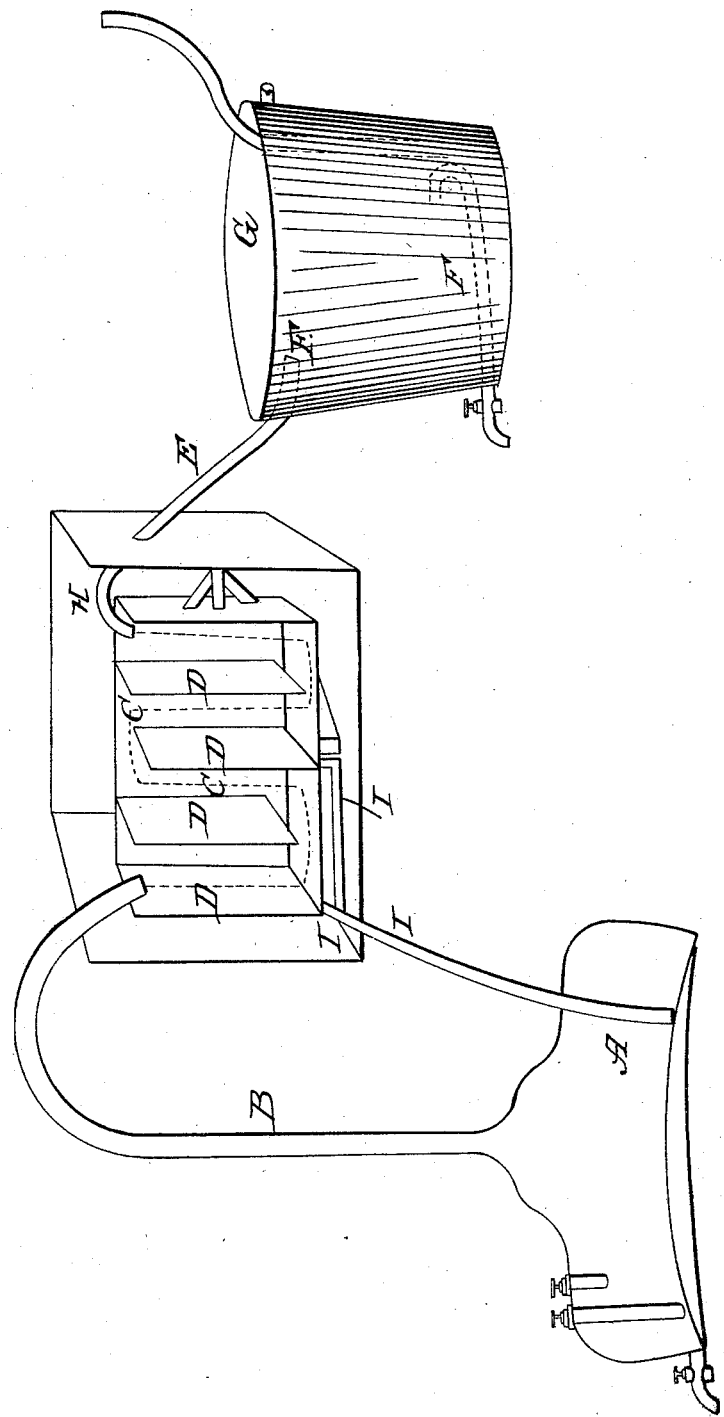

UNITED STATES PATENT OFFICE.

A. V. H. WEBB, OF NEW YORK, N. Y.

IMPROVEMENT IN THE PROCESS OF RECTIFYING THE OIL OF TURPENTINE AND OTHER ESSENTIAL OILS, SEPARATELY OR COMBINED, THE PRODUCT OF WHICH HE DENOMINATES "CAMPHENE-OIL."

Specification forming part of Letters Patent No. 1,082, dated February 19, 1839.

*To all whom it may concern:*

Be it known that I, AUGUSTUS V. H. WEBB, of the city, county, and State of New York, have discovered a method of producing a liquid for the purpose of affording artificial light, which I denominate "camphene" or "camphene-oil;" and I do hereby declare that the following is a full and exact description.

The nature of my discovery consists in distilling, with potash or other alkali and water, turpentine or the spirits or oil of turpentine and other essential oils, whether separate or combined, the result of which distillation is a liquid I denominate "camphene" or "camphene-oil," and which, being burned in a burner of proper construction, produces a powerful and beautiful light.

To enable others skilled in the art to make and use my discovery, I will describe its nature and operation.

I construct a still or boiler of any of the approved forms, A, leading therefrom an adapting pipe, B, passing upward and entering a case, C, made of copper or other metal, which case is placed into a vat, H, which is supplied with and contains water, the temperature of which is to range from, say, 120° to 150° Fahrenheit, according to circumstances. Said case is made with partitions D inside. One, connected to the top of the case, reaches down to within two or three inches of the bottoms. The next, connected to the bottom, reaches to within the same distance of the top, and so on through the case, forming apartments $c$ into and through which the steam is caused to pass before it enters through pipe E into the worm F, which, passing through cold water contained in tub G, condenses it into a liquid or liquids. That portion of the steam which may be condensed in passing through the apartments in the case C is returned into the boiler by means of short tubes I, leading from the bottom of each apartment into a main return-pipe, J, the whole apparatus being represented in the drawing herewith presented. In the still or boiler I place water, with such proportion of alkali as the quantity of impure matter contained in the spirits or oils to be added may require, to be governed by the skill of the operator. I then add the turpentine or spirits or oil of turpentine, or other essential oils, in quantity almost equal to the water, and, kindling the fire under the boiler, the steam rises and passes through the apparatus described. The heavier parts, being condensed, return into the still, and the lighter and purer parts, issuing at the upper extremity of the case C, enter the worm F, and are condensed into two liquids—viz., water and the oil, denominated "camphene" or "camphene-oil."

What I claim as my discovery, and desire to secure by Letters Patent, is—

The manufacturing the liquid here denominated "camphene" or "camphene-oil," which is produced by distillation with water and potash or other alkali, turpentine, or the spirits or the oil of turpentine, or other essential oils, whether separate or combined, and by whatever apparatus or mode the distillation may be effected.

AUGS. V. H. WEBB.

Witnesses:
WM. P. ELLIOT,
BENJ. E. GREEN.